Sept. 2, 1941.　　　K. C. RIPLEY　　　2,254,243
PHASE SELECTOR
Filed June 17, 1939　　　2 Sheets-Sheet 1

WITH INPHASE INPUT TO GRID

WITH OUT-OF-PHASE INPUT TO GRID

INVENTOR
KENNETH C. RIPLEY
BY
ATTORNEY

Sept. 2, 1941.     K. C. RIPLEY     2,254,243
PHASE SELECTOR
Filed June 17, 1939     2 Sheets-Sheet 2

INVENTOR
KENNETH C. RIPLEY
BY
ATTORNEY

Patented Sept. 2, 1941

2,254,243

UNITED STATES PATENT OFFICE 2,254,243

PHASE SELECTOR

Kenneth C. Ripley, Washington, D. C.

Application June 17, 1939, Serial No. 279,654

1 Claim. (Cl. 171—95)

(Granted under the act of March 3, 1883, as amended April 30, 1928; 370 O. G. 757)

This invention relates to a means for selecting from any given alternating current voltage having more than one component, that component of voltage which is of interest and amplifying it for observation and recording, while at the same time eliminating from the operation of the amplifying means any component which is not of interest.

A particular application of this invention is to a device invented by Robert H. Canfield, for which an application Serial No. 250,383, entitled "Method of and apparatus for examining ferromagnetic articles" was filed January 11, 1939. It is unnecessary to discuss the details of the operation of that invention except insofar as they affect the operation of the present invention.

Figure 1:
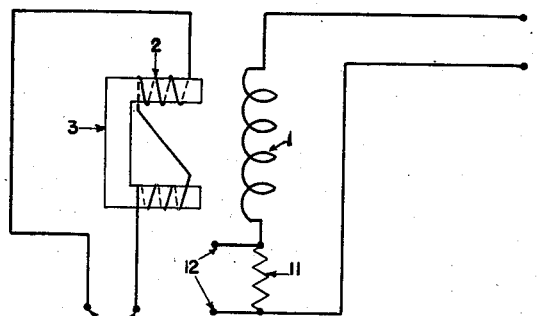
Fig. 1 is a diagrammatic view of a portion of the device of the above-mentioned application Serial No. 250,383, with which the device of the present invention may be used.

In Fig. 1 the reference numeral 1 indicates an exciting coil, part of Canfield's invention, through which passes an alternating current. Coils 2 carried by a magnetic yoke 3, are also a part of Canfield's invention, and these coils in the operation of his device have an alternating voltage induced therein. This latter voltage contains components in phase and in quadrature with the current in the coil 1. In the application of Canfield's invention it is useful to be able to separate and estimate the magnitude of that component of voltage in coils 2 which is in-phase (or 180 degrees out-of-phase) with the current in coil 1.

The procedure here to be described for separating quadrature components of voltage makes use of an ordinary "screen-grid" vacuum tube, preferably a pentode vacuum tube, such as used in radio receivers.

Figure 2:
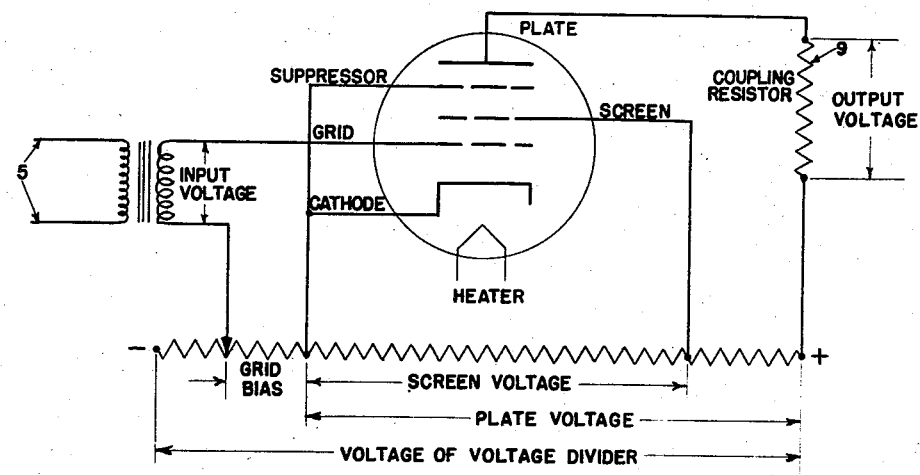
Fig. 2 is a diagrammatic view of a pentode vacuum tube connected to function as an ordinary amplifier.

If a pentode tube be connected to function as an ordinary amplifier, the two quadrature components of the grid voltage are amplified alike. If one component of voltage is amplified one hundred times then the other component will likewise be amplified one hundred times—for the range of voltage where amplification is linear. The connections which are necessary for causing a pentode vacuum tube to operate as an ordinary amplifier are shown in Fig. 2. The conductors 4 of Fig. 1 would be connected to conductors 5 of Fig. 2.

Figure 3:
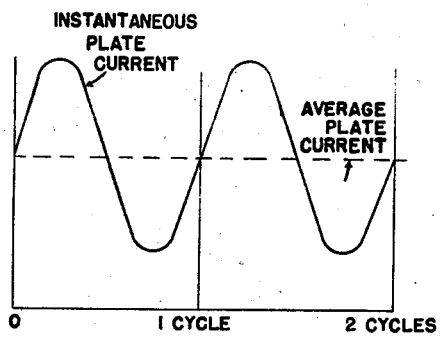
Figs. 3 and 4 are graphs showing the relation of the amplified phase and out-of-phase components of the grid voltage to the plate current of the tube of Fig. 2.

In Fig. 3 is shown the appearance of the voltage wave of that component of the plate current of the tube of Fig. 2 which is in-phase with the current in coil 1.

Figure 4:
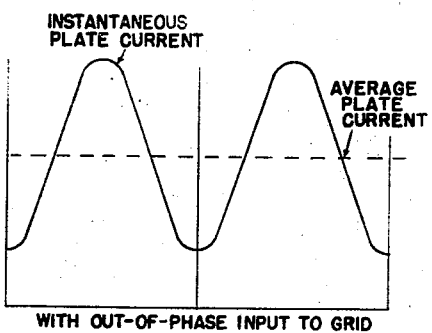

In Fig. 4 is shown the appearance of the voltage wave of that component of the plate current which is in quadrature with the current in coil 1.

Figure 5:
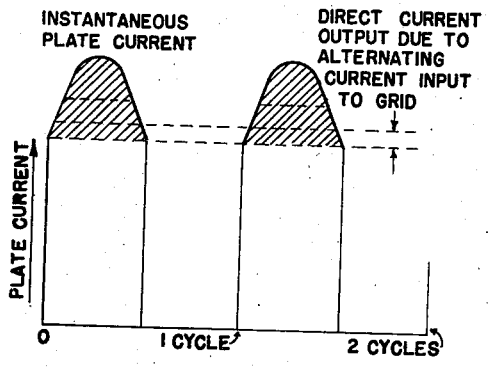
Figs. 5 and 6 are graphs showing the relations of the amplified portions of the two components of grid voltage when the amplifying device is arranged in accordance with the present invention.
Figure 6:
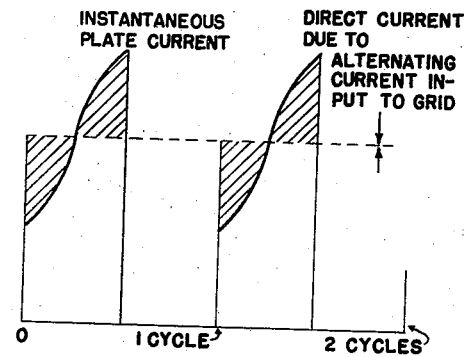

In order to cause a tube of the type shown in Fig. 2 to selectively amplify only that component of voltage in which one is interested, the operation of the tube must be made discontinuous. For instance, if the screen voltage of the radio tube were reduced to and held at zero during each half cycle when the in-phase component of voltage was negative, the appearance of the amplified wave forms of voltage would be as shown in Figs. 5 and 6. The wave form for amplification of the in-phase voltage would be an ordinary wave form with the negative portion thereof lopped off, as shown in Fig. 5. The wave form for amplification of the quadrature component of the voltage would be an ordinary wave form with half of the positive portion and half of the negative portion lopped off, as shown in Fig. 6.

While the desired results could be obtained by applying to the screen of the tube of Fig. 2 an alternating current voltage of proper value and in phase with the voltage of coil 1, in practice it is more convenient to secure the desired intermittent blocking of the tube by the application of an alternating current voltage in phase with the voltage of coil 1, superimposed on a certain value of direct current voltage.

Figure 7:
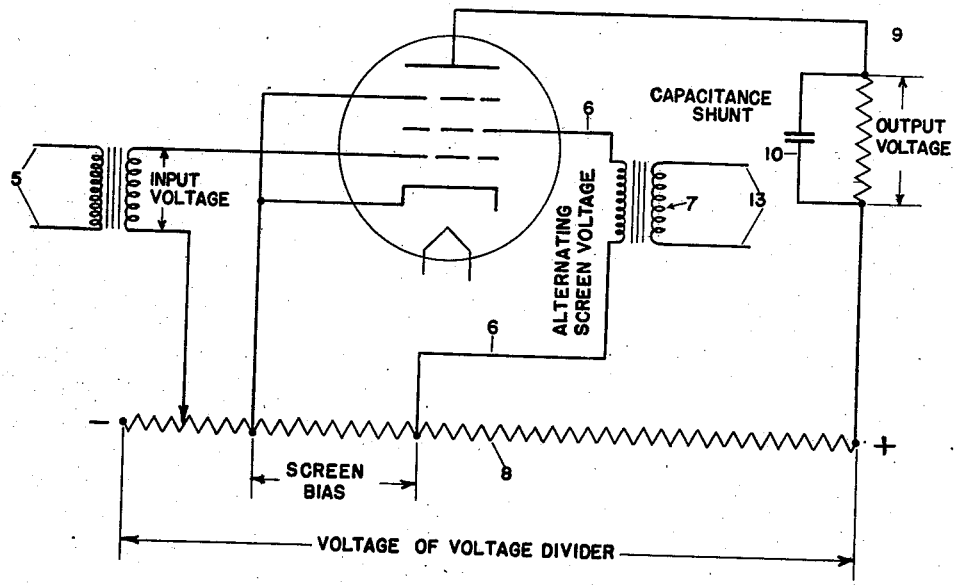
Fig. 7 shows a pentode tube amplifier circuit arranged in accordance with this invention.

The circuit connections for causing the tube of Fig. 2 to operate in this fashion are shown in Fig. 7. The screen of the tube is connected to a source of direct current voltage by the connection of line 6 to the proper point of the voltage divider 8. This point is so selected that any reduction in the voltage derived therefrom will cause blocking of the tube.

Coupled to the same line 6 by means of transformer 7 is a source of alternating current voltage in phase with the voltage in coil 1. Such a source is conveniently secured by inserting an ohmic resistance 11, as shown in Fig. 1, in series with coil 1 and connecting the conductors 12 leading from the terminals of this resistance to the lines 13 of Fig. 7.

With this arrangement of circuit connections the amplified in-phase component of the voltage in coil 2 may be observed to the exclusion of the quadrature component by connecting a direct-current voltmeter across the coupling resistor 9 of Fig. 7. The alternating character of the amplified out-of-phase component as shown in Fig. 6 will prevent its registry on the voltmeter, while the pulsating character of the in-phase component will allow it to register.

For certain applications it is desirable to smooth out the wave forms of Fig. 5. This may be done by the use of a low resistance shunt designed to pass alternating current but not direct current. The required shunt is a properly chosen capacitance located as shown at 10 in Fig. 7. The shunt serves to transform the pulsating wave form of voltage as shown in Fig. 5 to direct-current voltage and to by-pass the alternating wave form of voltage shown in Fig. 6. The output of the coupling resistor of Fig. 7 will then be direct-current voltage which responds to, and only to, changes in the in-phase component of the alternating-current in-put voltage.

The changing value of screen voltage during operating periods of the radio tube, due to the alternating component of screen voltage, means that the wave forms of Figs. 5 and 6 will be distorted somewhat, but not to any disadvantage. The output of the coupling resistor 9 of Fig. 7 will still be responding to, and only to, changes in that component of voltage which is in phase with the alternating current voltage applied to the screen of the vacuum tube.

While the foregoing description has been confined to but one form of execution of the invention, it is to be understood that the invention is limited solely by the scope and limitations of the subjoined claim.

The invention described herein may be manufactured and/or used by or for the Government of the United States of America for governmental purposes without the payment of any royalties thereon or therefor.

I claim:

Means for selectively rectifying and amplifying one of two quadrature components of an alternating current voltage, comprising a thermionic amplifying means having a control grid and a screen which when negatively biased past a certain point will cause said amplifying means to be blocked, means impressing said alternating current voltage across said control grid, means impressing a direct current voltage on said screen of such value that a reduction in said value will cause blocking of said amplifying means, and means superimposing on said direct current voltage an alternating current voltage in-phase with that one of said two quadrature components which it is desired to amplify.

KENNETH C. RIPLEY.